(12) United States Patent
Takeuchi (10) Patent No.: US 7,992,056 B2
(45) Date of Patent: Aug. 2, 2011

(54) ERROR MONITORING AND NOTIFICATION FOR A REPLACEABLE UNIT

(75) Inventor: Tamotsu Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 312 days.

(21) Appl. No.: 12/427,168

(22) Filed: Apr. 21, 2009

(65) Prior Publication Data

US 2009/0300433 A1 Dec. 3, 2009

(30) Foreign Application Priority Data

Jun. 2, 2008 (JP) ................................. 2008-144250

(51) Int. Cl.
*G06F 11/00* (2006.01)
(52) U.S. Cl. ........................................ 714/48; 714/47.2
(58) Field of Classification Search .......................... None
See application file for complete search history.

(56) References Cited

U.S. PATENT DOCUMENTS

| | | | | |
|---|---|---|---|---|
| 5,293,556 | A * | 3/1994 | Hill et al. ........................ | 702/184 |
| 7,770,048 | B2 * | 8/2010 | Aksamit et al. ................ | 713/502 |
| 2002/0138235 | A1 * | 9/2002 | Edwards et al. ............... | 702/184 |
| 2003/0216881 | A1 * | 11/2003 | Weiss et al. .................... | 702/130 |
| 2004/0078634 | A1 * | 4/2004 | Gilstrap et al. ................. | 714/5 |
| 2004/0153686 | A1 | 8/2004 | Gilstrap et al. | |
| 2004/0221198 | A1 | 11/2004 | Vecoven | |
| 2005/0229039 | A1 * | 10/2005 | Anderson et al. ............... | 714/23 |
| 2008/0208533 | A1 | 8/2008 | Yokogawa | |

FOREIGN PATENT DOCUMENTS

| | | |
|---|---|---|
| JP | 57-161949 | 10/1982 |
| JP | 61-282944 | 12/1986 |
| JP | 4-3233 | 1/1992 |
| WO | 2006/077900 | 7/2006 |

OTHER PUBLICATIONS

European Search Report issued on Aug. 24, 2010 in corresponding European Patent Application No. 09156120.9.

* cited by examiner

*Primary Examiner* — Gabriel L Chu
(74) *Attorney, Agent, or Firm* — Staas & Halsey LLP (57) ABSTRACT

There is provided an information processing apparatus that includes a CPU board 1 having a processing unit, a control device (CPU 11, CPU board controller 12, and the like) that is mounted on the CPU board 1 and includes hardware replacement management area 16 that stores replacement information indicating that the CPU board 1 has been replaced, the replacement information initialized at the time when the information processing apparatus is started or when the CPU board 1 is replaced, a memory 13 that stores error information based on occurrence of an error in the control device, the error information initialized at the time when the information processing apparatus is started, an initialization control section 18 that initializes the information processing apparatus, and a unit control section 45 that includes an error monitoring section 42 that monitors the error information stored in the memory 13 and controls the CPU board 1.

10 Claims, 10 Drawing Sheets

ERROR MONITORING AND NOTIFICATION FOR A REPLACEABLE UNIT

CROSS-REFERENCE TO RELATED APPLICATIONS

This application is based upon and claims the benefit of priority of the prior Japanese Patent Application No. 2008-144250, filed on Jun. 2, 2008, the entire contents of which are incorporated herein by reference.

FIELD

The present invention relates to an information processing apparatus, an error notification program, and an error notification method that enable error notification, when hardware, for which error notification is disabled due to frequent hardware errors, is replaced (hot replaced) while a system is operated.

BACKGROUND

When an error occurs in hardware, information of the error that occurs is stored in a non-volatile memory, such as an SRAM and an NVRAM, or a storage area of a storage device, such as a hard disk. The user knows occurrence of a hardware error by referring to stored error information, and uses the information as a guide for parts replacement.

On the other hand, when errors of the same content occur frequently and all of error information is stored in a storage area, problems described below are generated.

Since a large amount of error information is stored in a storage area, shortage of the storage area is apt to be generated.

A storage area becomes full with errors of the same content, and the user needs to spend time for checking whether or not other errors have occurred.

Since many errors are notified, error notification time becomes long and performance of processing other than error notification is deteriorated.

Therefore, when errors of the same content occur frequently, or in similar cases, there generally used a function for recording an error occurrence history and disabling storing of error information exceeding a certain amount.

On the other hand, some computer systems include a hot replace function that enables replacement of some modules of hardware while a system is operated. The hot replace function is used when hardware, for which errors occur frequently, is replaced without stopping a system.

When hardware is replaced, hardware after replacement is hardware, for which no error has occurred. Accordingly, when an error occurs for the hardware after replacement, such an error needs to be notified since there is need for consideration of replacement again. That is, when a hardware error occurs after hardware is replaced during operation of a system, such an error needs to be notified.

In general, two types of methods described below are used for not disabling error notification after hardware replacement.

A first method is a method of enabling error notification by clearing information indicating "error notification is disabled" at a timing of hardware replacement.

When setting for disabling error notification and the like is made in software, such as server management software and a service processor, that manages replacement of hardware, a method of clearing information indicating "error notification is disabled" at the time of hardware replacement is used since the user can know a timing of the hardware replacement.

A second method is a method of providing an area for managing an occurrence history of errors in hardware to be replaced.

First, an area that stores the number of times of error occurrences and information indicating "error notification is disabled" is provided in hardware to be replaced. When errors occur frequently and the hardware in a state where "error notification is disabled" is replaced, error notification after hardware replacement can set to be not disabled, since an area that manages an error history of hardware after replacement has information indicating "error notification is not disabled" as an initial state.

Patent Document 1

Japanese Laid-open Patent Publication No. 61-282944

Patent Document 2

Japanese Laid-open Patent Publication No. 04-003233

Patent Document 3

Japanese Laid-open Patent Publication No. 57-161949

Here, description will be made with respect to problems of the two types of methods generally used for not disabling error notification after hardware replacement.

Described below is a problem with respect to the first method that is a method for clearing information indicating "error notification is disabled" at a timing of hardware replacement.

Server management software, a service processor, and the like normally may not access a central processing unit (CPU), a memory, and the like of a system, and may not detect an error that occurs in a CPU, a memory, and the like. On the other hand, firmware, such as a basic input output system (BIOS), can access a CPU, a memory, and the like of a system, and can detect an error that occurs in a CPU, a memory, and the like.

With respect to an error that is detected by firmware, such as a BIOS, the firmware, such as a BIOS, generally manages disabling of error notification, and the like.

There is a method, in which, with respect to an error detected by firmware, such as a BIOS, disabling of error notification and the like is managed by server management software, a service processor, and the like, and not by the firmware, such as a BIOS. However, since a number of errors are notified when errors occur frequently in the inside of a system, error notification time becomes long and there is generated a problem, such as performance of processing other than error notification is deteriorated.

In addition, firmware, such as a BIOS, generally does not require processing for hardware replacement at the time of hardware replacement. Accordingly, the firmware is never called up at the time of hardware replacement. That is, for a system, where firmware, such as a BIOS, manages disabling of error notification, there is a need to add processing for calling up the firmware, such as a BIOS, at a timing of hardware replacement in order to clear information indicating "error notification is disabled" at the time of hardware replacement.

Also, when hardware replacement is carried out during operation of a system by a general-purpose OS generally used, the OS and an OS driver carry out replacement processing. In order to call up firmware, such as a BIOS, at a timing of hardware replacement, processing depending on the system is required. For example, a register for issuing a firmware interrupt needs to be prepared in a chip set, and the firmware needs to be called up in a manner that the OS driver writes in the chip-set register at the time of replacement processing.

That is, in a computer system where error notification processing is carried out by firmware, such as a BIOS, dedicated hardware needs to be prepared and an OS or an OS driver needs to carry out processing that depends on a system, in order to clear information indicating "error notification is disabled" at the time of hardware replacement. Also, there is a problem that, in order to achieve the processing that depends on the system by the OS or the OS driver, the OS or the OS driver needs to be changed for each system.

Described below is a problem with respect to the second method that is a method of providing an area for managing an occurrence history of errors in hardware to be replaced.

The area that manages an error occurrence history requires size that is large to a certain extent. For example, information, such as the number of times of error occurrences, error occurrence time, and a flag indicating whether an error is disabled or not, needs to be stored in each part on hardware to be replaced.

However, with respect to a system that is constituted by a combination of commercially available chip sets, providing the area that manages an error occurrence history on hardware to be replaced is difficult without providing a dedicated memory area on the hardware to be replaced. This is because commercially available chip sets often do not include a storage area of large size.

When a dedicated memory area is provided on hardware to be replaced, there are problems, such as increase in cost of parts, and that part implementing area becomes large.

SUMMARY

According to an aspect of the present invention, there is provided an information processing apparatus including a unit having a processing unit. The information processing apparatus includes a control device, a first storage device, and a unit control section. The control device is mounted on the unit and includes a replacement information storage section that stores replacement information indicating that the unit has been replaced, where the replacement information is initialized at the time when the information processing apparatus is started or when the unit is replaced. The first storage device stores error information based on occurrence of an error in the control device, where the error information is initialized at the time when the information processing apparatus is started. The initialization control section initializes the information processing apparatus. The unit control section includes an error monitoring section that monitors error information stored in the storage device, and controls the unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Description will be made with respect to a computer system (information processor) in the present embodiment. In the present invention, description will be made by exemplifying a CPU board (unit) as hardware to be replaced. In addition, the computer system of the present embodiment includes at least two of operating and non-operating CPU boards in advance. When an error occurs on the CPU board, energization of the operating CPU board is turned off and energization of the non-operating CPU board is turned on. In this manner, replacement of the CPU boards is carried out. The present embodiment can be applied to a form of physically replacing the CPU board (a form of physically taking out a CPU board having an error and physically mounting a new CPU board in the computer system).

Figure 1:
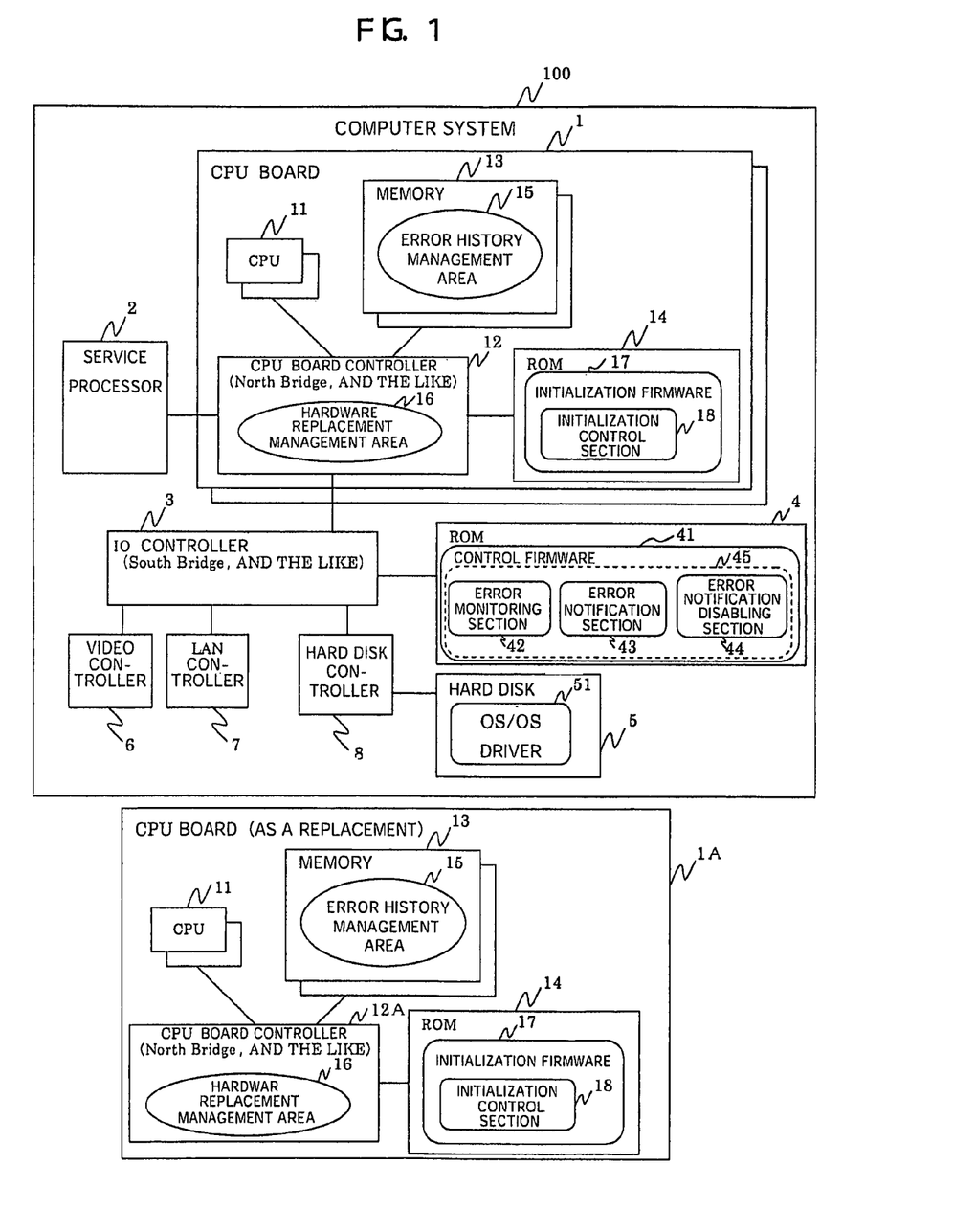
FIG. 1 is a view illustrating an example of a configuration of a computer system according to the present embodiment.

FIG. 1 illustrates a configuration diagram of the computer system of the present embodiment. A computer system 100 includes a CPU board 1 (unit) having a hot replace function that enables replacement during operation of a system, and a service processor 2 (system control device) that controls the computer system 100 and is a destination of notification when an error occurs.

In addition, the computer system 100 includes an IO controller 3 that controls input and output of data of peripheral equipment. The IO controller 3 is connected with a video controller 6 that controls display of a monitor (not illustrated), a LAN controller 7 that controls communication to a network, and a hard disk controller 8 that controls input and output of a hard disk 5.

Further, the computer system 100 includes a ROM 4 that is a non-volatile storage device, and retains control firmware 41, which is a BIOS relating to entire control of the computer system 100. Moreover, the computer system 100 includes the hard disk 5 that retains an OS and OS driver 51 (hereinafter referred to as the OS/OS driver 51). Also, the hard disk 5 is connected with the hard disk controller 8.

Description will be made with respect to the CPU board 1. The CPU board 1 includes a CPU 11 (processing unit) as a control device, and a memory 13 as a storage device. Also, the CPU board 1 includes a ROM 14 that retains initialization firmware 17 as a BIOS for a CPU board. In addition, the CPU board 1 includes a CPU board controller 12 that controls input and output of data of the CPU 11, the memory 13, and the ROM 14. The CPU board controller 12 is connected to the service processor 2, the CPU 11, the memory 13, the ROM 14, and the IO controller 3.

FIG. 1 also illustrates a CPU board 1A as a CPU board as a replacement. Description of the CPU board 1A is omitted, since configuration of control devices mounted on the CPU board 1A is same as those of the CPU board 1.

The memory 13 includes an error history management area 15 for managing an error occurrence history. The CPU board controller 12 includes a hardware replacement management area 16 (replacement information storage section) that manages whether or not hardware has been changed or not. Here, description will be made with respect to the error history management area 15 and the hardware replacement management area 16.

The error history management area 15 has characteristics described below.

The area records an error history.

The area is initialized by the initialization firmware 17 when the computer system 100 is started.

An error occurrence position, the number of times of error occurrences, error occurrence time, and an error notification disabling flag (a flag indicating whether or not error notification is disabled) (disabling information) are recorded as an error history in the area by the control firmware 41 when an error occurs.

The area is not initialized when replacement is made from the CPU board 1 to the CPU board 1A during operation of the computer system 100 (information is not changed between before and after hardware replacement).

The area requires comparatively large size.

As to a location where the area exists, the location may or may not be on a unit to be replaced (on the CPU board 1).

The hardware replacement management area 16 has characteristics described below.

The area manages whether or not a CPU board has been replaced.

The area needs to exist on a unit to be replaced (on the CPU boards 1 and 1A).

Initialized by the initialization firmware 17 when the computer system 100 is started.

Information indicating that an error occurs in the unit is recorded in the area by the control firmware 41 when an error occurs.

The area is initialized by the initialization firmware 17 when hardware replacement is carried out during operation of the computer system 100.

The area requires size of only one bit or larger. For example, a register area of a chip set is used for the initialization firmware 17.

The control firmware 41 and the initialization firmware 17 perform management of disabling of error notification, and the like by controlling the error history management area 15 and the hardware replacement management area 16.

Next, description will be made with respect to the control firmware 41 and the initialization firmware 17.

First, characteristics of the control firmware 41 will be explained as described below.

As to a location where the control firmware 41 exists, the location may or may not be on a unit to be replaced (on the CPU boards 1 and 1A).

The control firmware 41 functions as a unit control section 45 that controls a system for processing of error notification at the time an error occurs, and the like. When the unit control section 45 is further subdivided, there are functions as an error monitoring section that monitors error information stored in the error history management area, an error notification section 43 that notifies error information to the service processor 2, and an error notification disabling section 44 that disables notification of error information to the service processor 2 performed by the error notification section 43 when an error occurrence frequency exceeds a predetermined frequency.

Next, characteristics of the initialization firmware 17 will be explained as described below.

The initialization firmware 17 initializes hardware when the computer system 100 is started, and functions as an initialization control section 18 that initializes the CPU board 1A as a replacement (to be added) when the CPU board 1 is replaced.

The initialization firmware 17 needs to exist on hardware to be replaced (on the CPU boards 1 and 1A).

Each of the functions of the unit control section 45, an error monitoring section 42, the error notification section 43, the error notification disabling section 44, and the initialization control section 18 is achieved in a manner that the above described firmware is executed by a processing unit, such as the CPU 11 (that is, software resources and hardware resources cooperate with each other).

Next, description will be made with respect to a procedure of replacing the CPU board 1, on which errors frequently occur, with the CPU board 1A during operation of the computer system 100 with reference to FIGS. 2 to 6.

Figure 2:
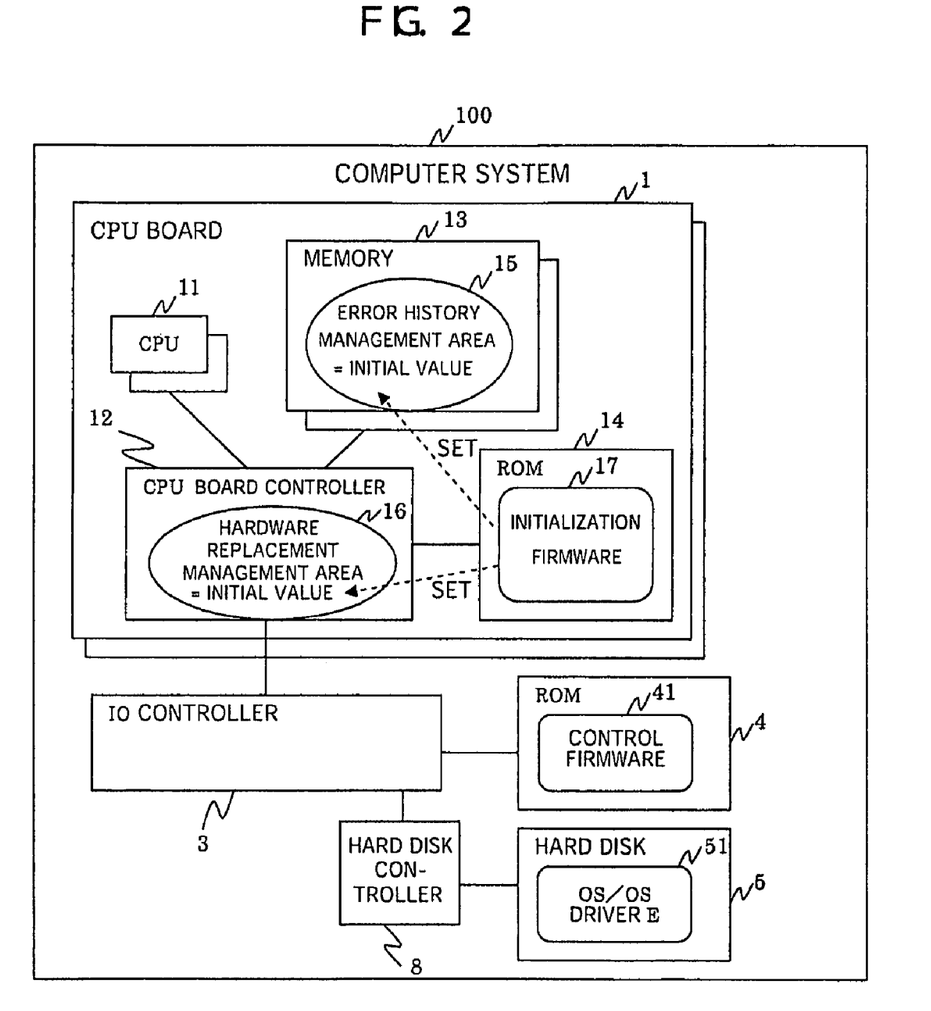
FIG. 2 is a view illustrating a state before an error occurs according to the present embodiment.

First, a state after the computer system 100 is started and before an error occurs is illustrated in FIG. 2. The error history management area 15 and the hardware replacement management area 16 are set as described below by the initialization firmware 17 (the initialization control section 18) when the computer system 100 is started.

Figure 3:
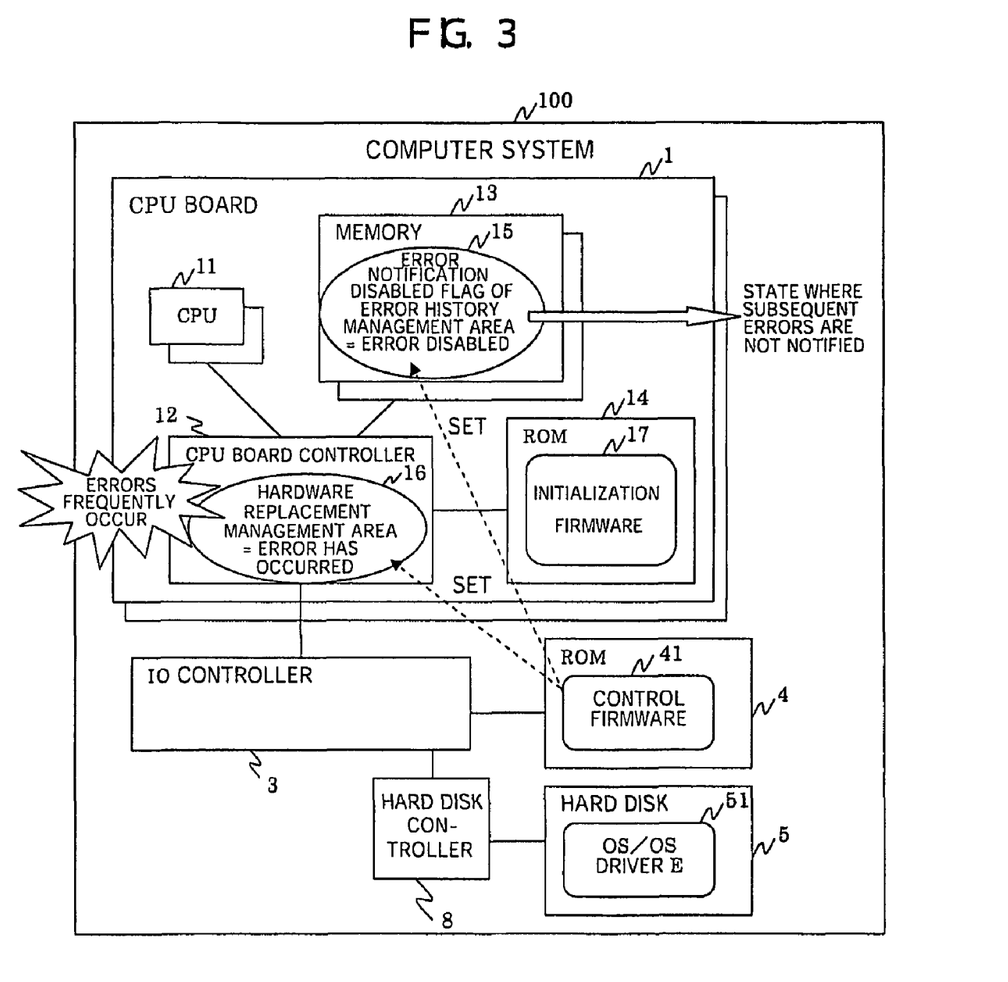
FIG. 3 is a view illustrating a state when an error occurs in a CPU board controller according to the present embodiment.

The error notification disabling flag of the error history management area 15=initial value The hardware replacement management area 16=initial value Next, FIG. 3 illustrates a state, where error occurs frequently on the CPU board controller 12 on the CPU board 1. Since errors occur frequently, the error history management area 15 and the hardware replacement management area 16 are set as described below by the error notification section 43 and the error notification disabling section 44 of the control firmware 41.

The error notification disabling flag of the error history management area 15="Error disabled"

The hardware replacement management area 16="Error has occurred"

By the error notification disabling flag of the error history management area 15 being set to "Error disabled", subsequent error notification is disabled.

Figure 4:
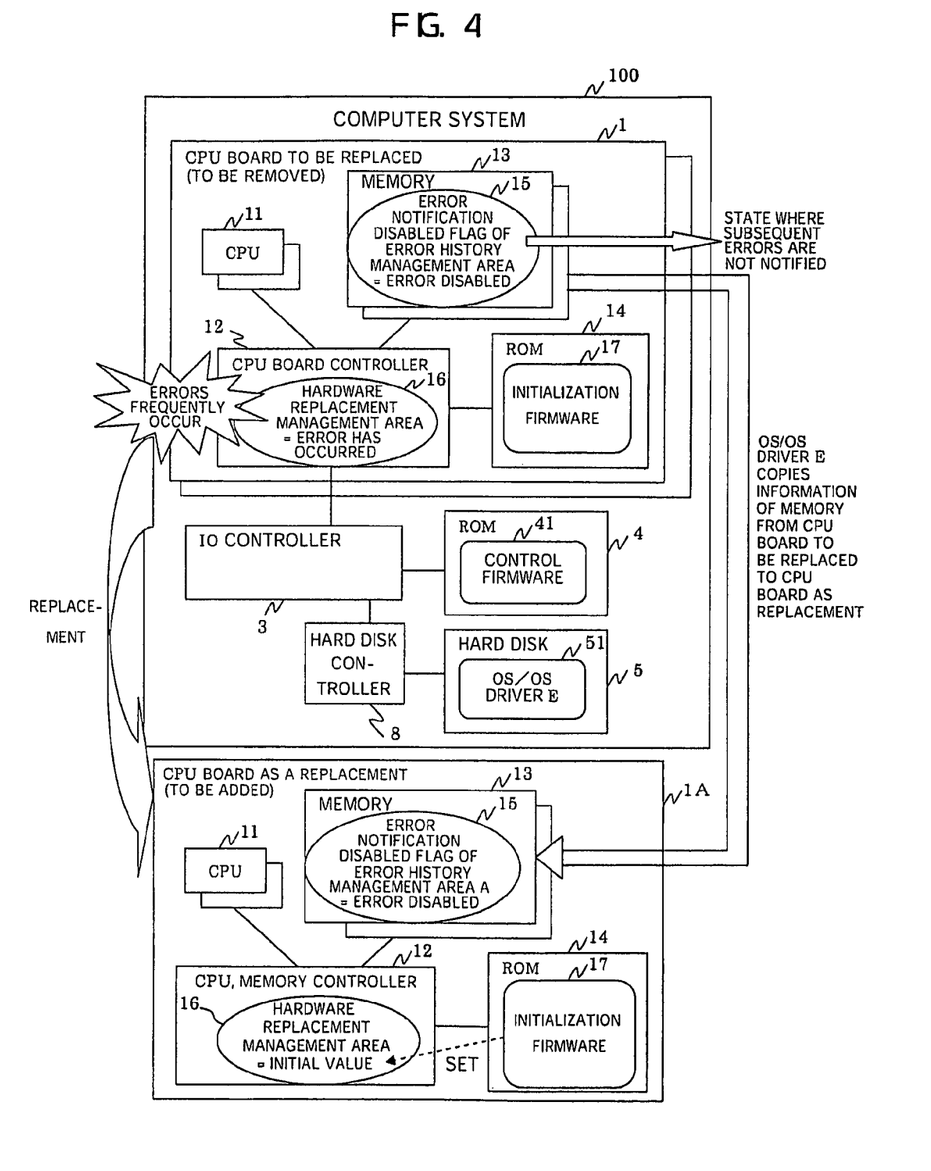
FIG. 4 is a view illustrating an example of a state where a CPU board, in which errors have frequently occurred, is replaced during operation of a computer system according to the present embodiment.

FIG. 4 is a view illustrating a state of replacing the CPU board 1, on which errors occur frequently, with the CPU board 1A during operation. At the time of hardware replacement, the OS/OS driver 51 copies memory information from the CPU board 1 to be replaced (to be removed) to the CPU board 1A as a replacement (to be added). Therefore, the error history management area 15 existing on a memory has setting described below that is the same as that before hardware replacement.

The error notification disabling flag of the error history management area 15="Error disabled"

On the other hand, the hardware replacement management area 16 is set as described below by the initialization firmware 17 (the initialization control section 18) on the replacement. The initialization firmware 17 is started when the CPU board 1A mounted as a replacement is energized.

The hardware replacement management area 16=initial value

Figure 5:
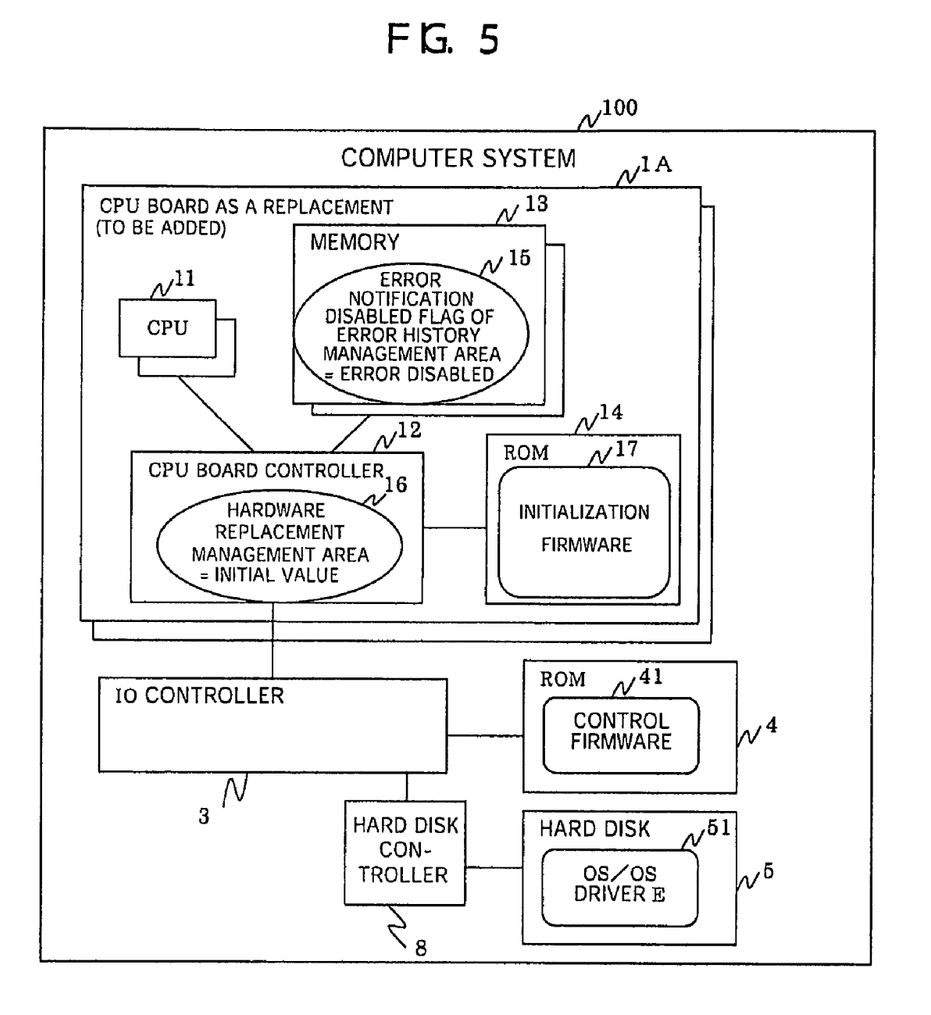
FIG. 5 is a view illustrating a state after replacement of the CPU board according to the present embodiment.

FIG. 5 is a view illustrating a state after hardware replacement. The error history management area 15 and the hardware replacement management area 16 of the CPU board 1A still have the setting illustrated in FIG. 4.

Figure 6:
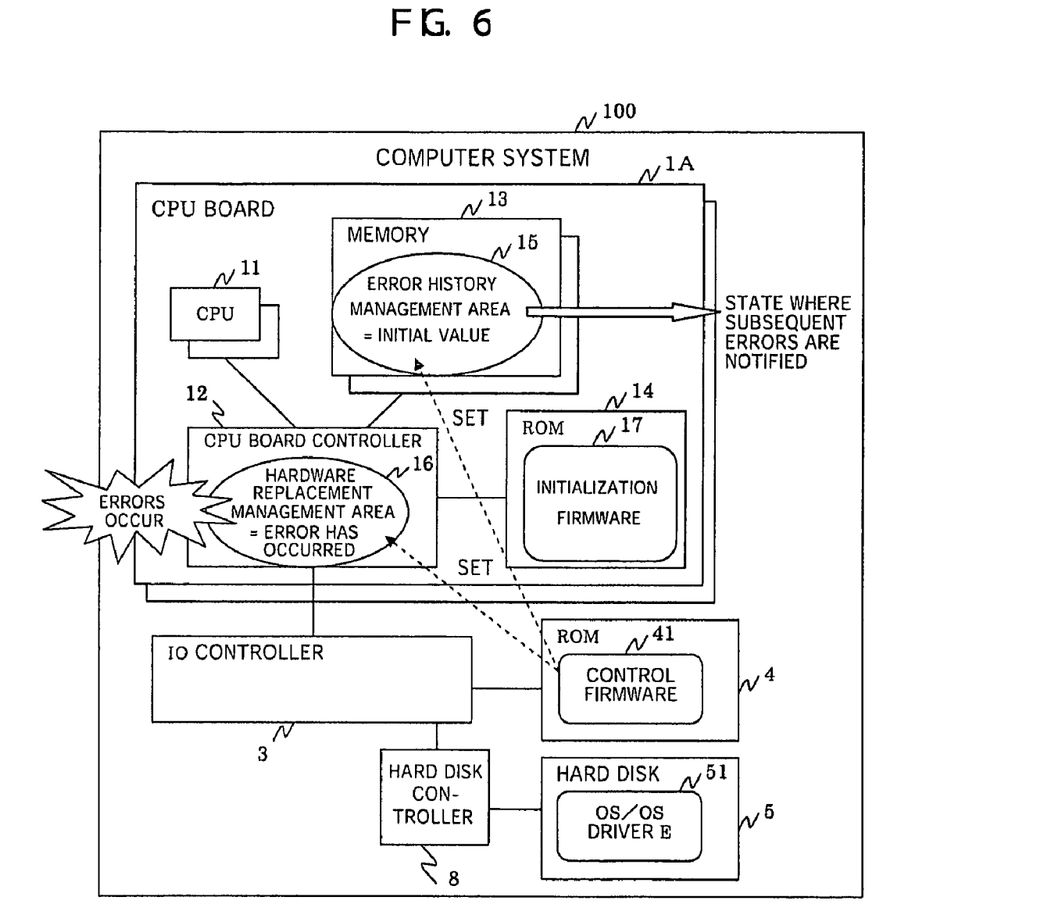
FIG. 6 is a view illustrating an example of a state when an error occurs after the replacement of the CPU board according to the present embodiment.

FIG. 6 is a view illustrating a state where an error occurs after the CPU board 1 is replaced. Since the hardware replacement management area 16 has an initial value ("No error has occurred"), the error notification section 43 of the control firmware 41 determines that the CPU board 1 has been replaced. That is, information retained in the hardware replacement management area 16 has a function also as information (replacement information) as to whether or not a unit has been replaced, in addition to as information for determining whether or not an error occurs.

After the above, the error notification section 43 determining that the CPU board has been replaced releases an error notification disabled flag by initializing the error history management area 15. Also, the error notification section 43 sets a flag of "Error has occurred" to the hardware replacement management area 16, and notifies an error that occurs.

Figure 7:
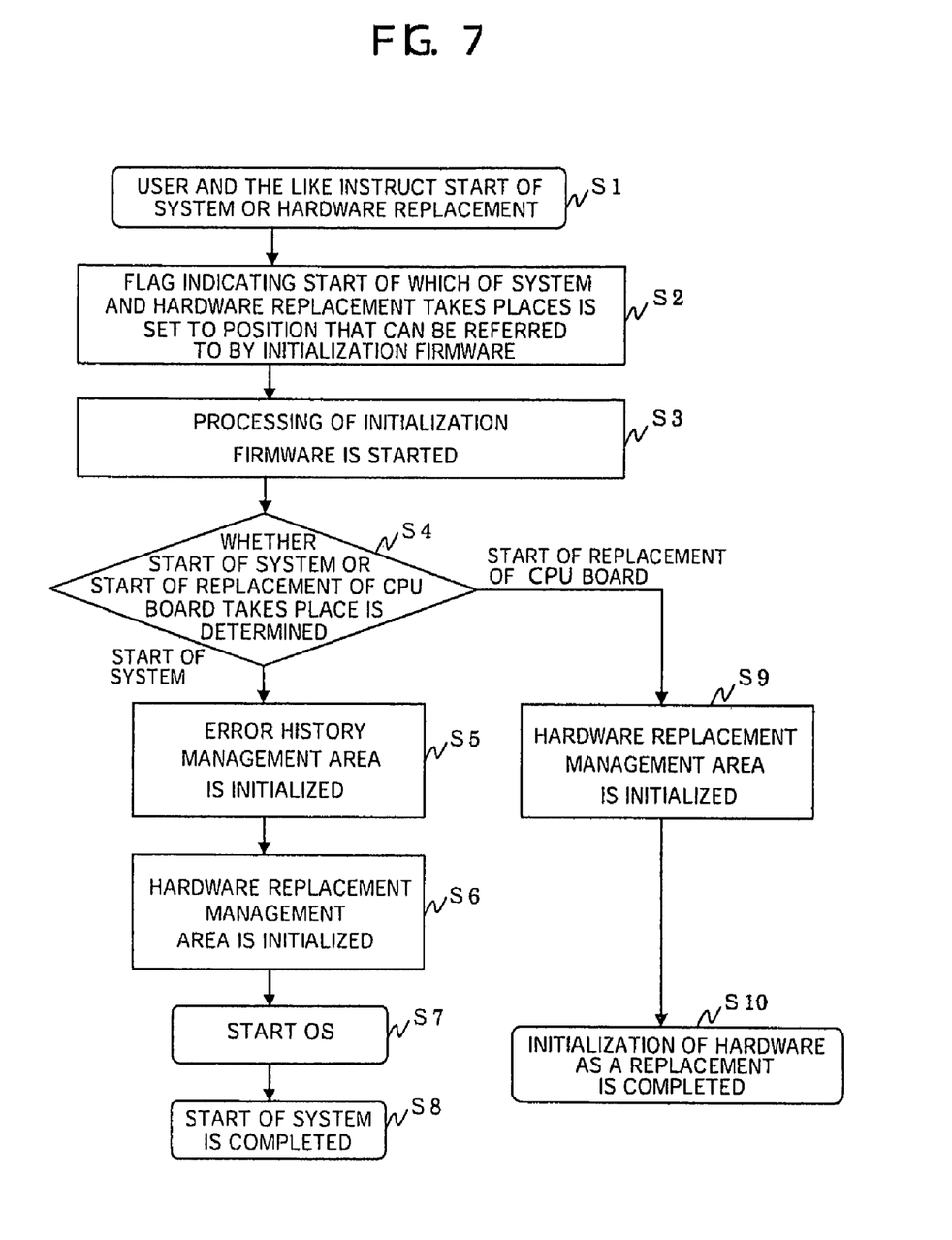
FIG. 7 is a flowchart illustrating an example of processing at the time of start of the computer system or replacement of hardware according to the present embodiment.
Figure 8:
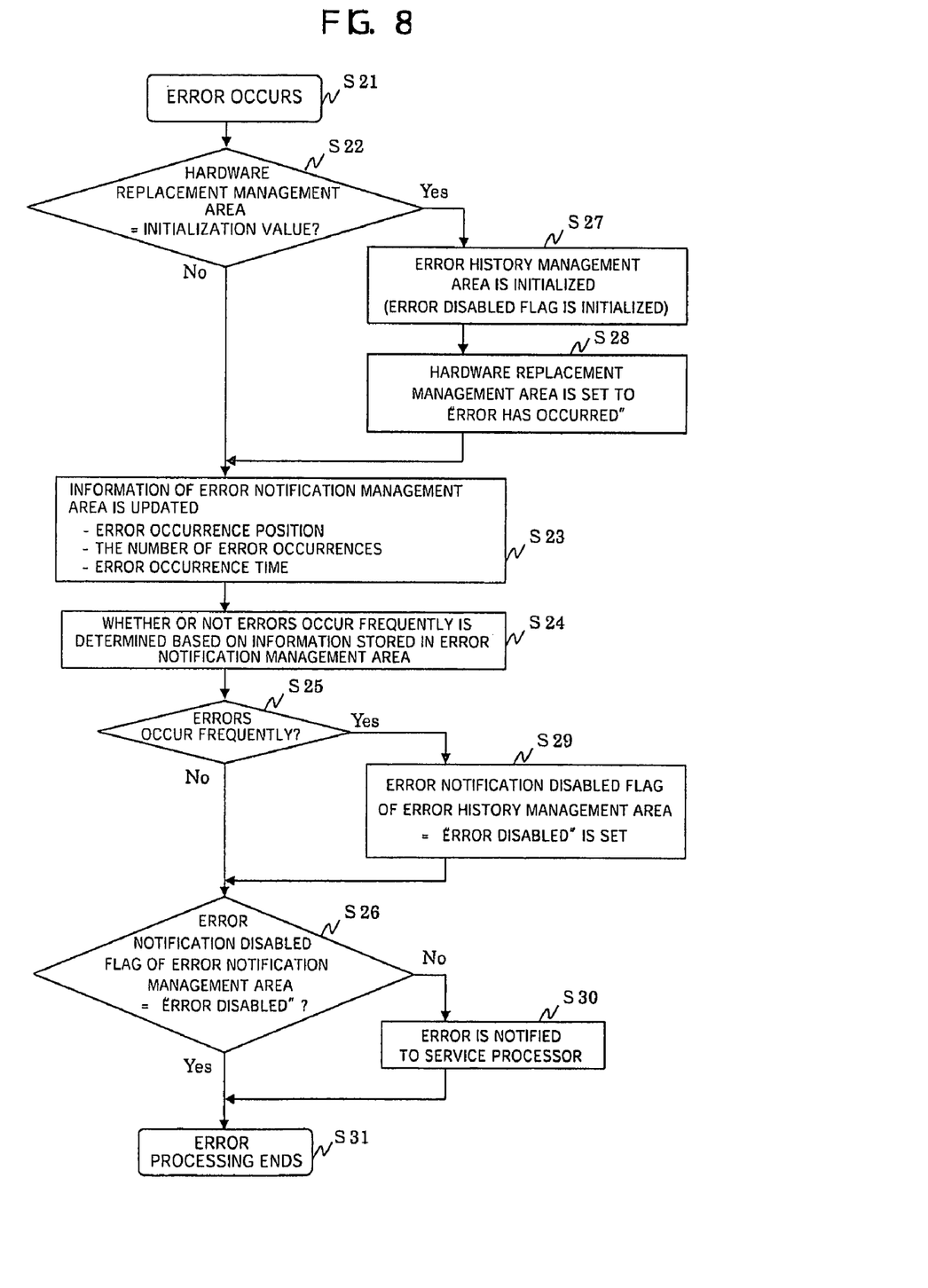
FIG. 8 is a flowchart illustrating processing of control firmware when an error occurs according to the present embodiment.

Next, description will be made with respect to methods of disabling error notification and releasing disabling of error notification by using the error history management area 15 and the hardware replacement management area 16 with reference to flowcharts illustrated in FIGS. 7 and 8.

First, processing at the time when the computer system 100 is started or at the time of hardware replacement will be described based on FIG. 7.

When the user or the like instructs start of the computer system 100 or hardware replacement (Step S1), the service processor 2 sets a flag indicating which of start of the computer system 100 and start of hardware replacement is instructed to a position that can be referred to by the initialization firmware 17 (for example, in the inside of the CPU board controller 12) (Step S2).

Next, the service processor 2 starts the initialization firmware 17, and processing of the initialization firmware 17 is started (Step S3).

The initialization firmware 17 refers to the flag set in Step S2 to determine which of start of the computer system 100 and start of the CPU board 1 that occurs at the time of replacement takes place (Step S4).

Here, when start of replacement of the CPU board 1 takes place (Step S4, Start of CPU board replacement), the initialization control section 18 initializes the hardware replacement management area 16 (Step S9). In this manner, initialization of hardware as a replacement is completed (Step S10).

On the other hand, when start of the computer system 100 takes place (Step S4, Start of system), the initialization control section 18 initializes the error history management area 15 (Step S5), and then initializes the hardware replacement management area 16 (Step S6).

After the above, an OS is started (Step S7), and start of the computer system 100 is completed (Step S8).

Next, description will be made with respect to processing of the control firmware 41 when an error occurs after start of the computer system 100 based on the flowchart in FIG. 8.

First, when an error occurs (Step S21), the error notification section 43 determines whether or not a flag of the hardware replacement management area 16 is that of an initial value (Step S22).

Here, when the flag of the hardware replacement management area 16 is that of an initial value (Step S22, Yes), the error notification section 43 initializes the error history management area 15 (Step S27). In addition, the error notification section 43 sets the flag of the hardware replacement management area 16 to a value of "Error has occurred" (Step S28). Then, the error notification section 43 updates the error history management area 15 by additionally writing information of an error occurrence position, the number of error occurrences, and error occurrence time in the error history management area 15 (Step S23).

On the other hand, when the flag of the hardware replacement management area 16 is not that of an initial value (that is, a value of "Error has occurred") (Step S22, No), processing of Step S23 is executed without changing the error notification area.

Next, the error monitoring section 42 monitors whether or not error information of the error history management area 15 of the memory 13 is additionally written to detect occurrence of an error, and issues a request for executing processing to the error notification disabling section 44.

The error notification disabling section 44 calculates an error occurrence frequency used as an index indicating how many times errors occur at the same position in a short period of time, based on the error occurrence position, the number of times of error occurrences, and error occurrence time described above stored in the error history management area 15. Then, the error notification disabling section 44 compares the calculated error occurrence frequency with a predetermined frequency set in advance to determine whether or not errors occur frequently (Step S24). As to the error occurrence frequency, for example, how many times errors have occurred at the occurrence position in a predetermined time interval is calculated.

When the error notification disabling section 44 determines that errors occur frequently (Step S25, Yes), the error notification disabling section 44 sets the error notification disabled flag of the error history management area 15 to a value of "Error disabled" (Step S29).

On the other hand, when the error notification disabling section 44 determines that errors do not occur frequently (Step S25, No), the processing moves to Step S26 as it is.

Next, the error notification section 43 determines whether or not the error notification disabled flag of the error history management area 15 has a value of "Error disabled" (Step S26). Here, when the flag does not have a value of "Error disabled" (Step S26, No), the error notification section 43 notifies error information to the service processor 2 (Step S30), and the processing ends (Step S31). On the other hand, when the flag has a value of "Error disabled" (Step S26, Yes), the processing ends as it is (Step S31).

Figure 9:
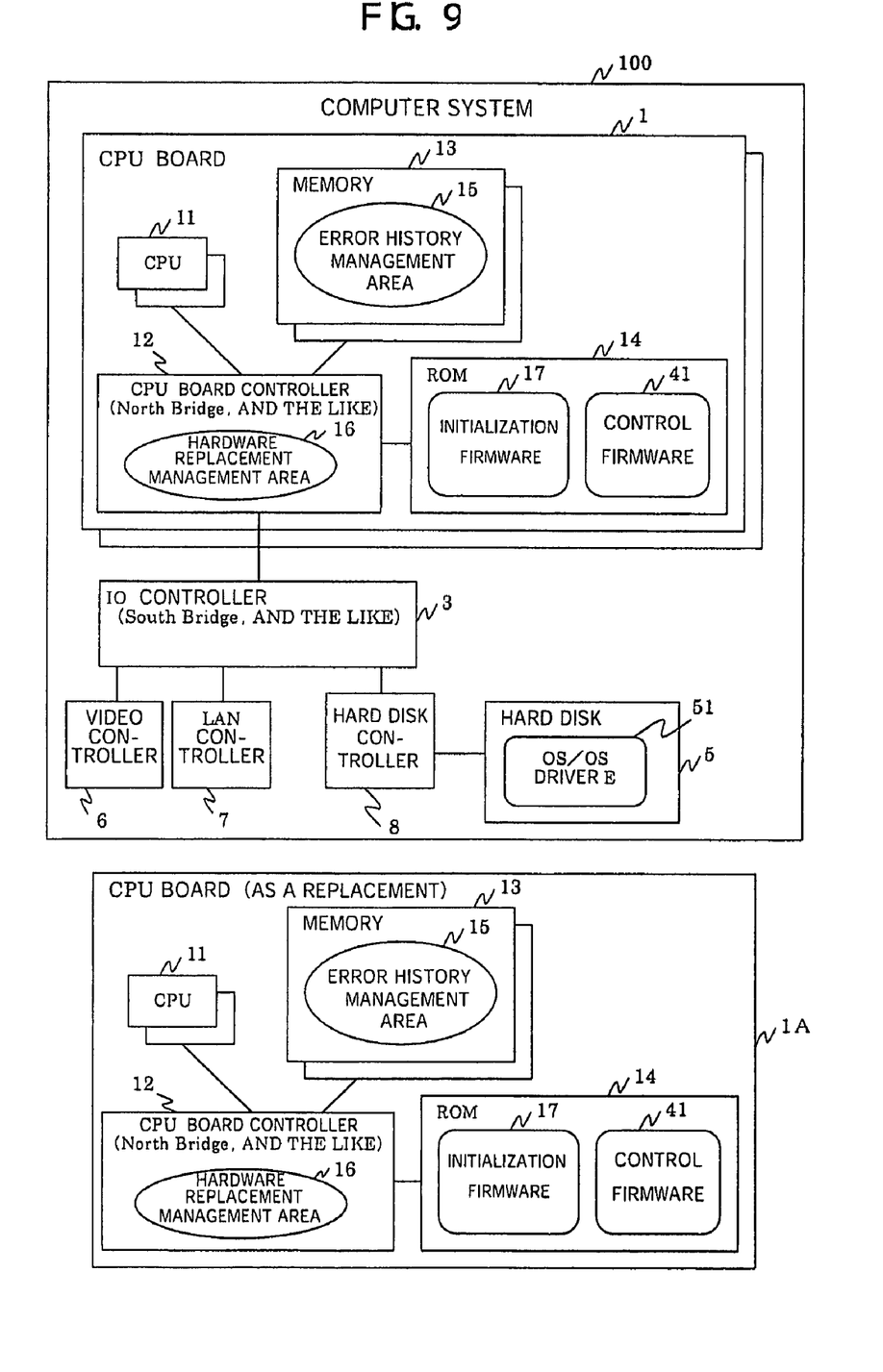
FIG. 9 is a view illustrating an example of arrangement when the control firmware exists on the CPU board according to the present embodiment.
Figure 10:
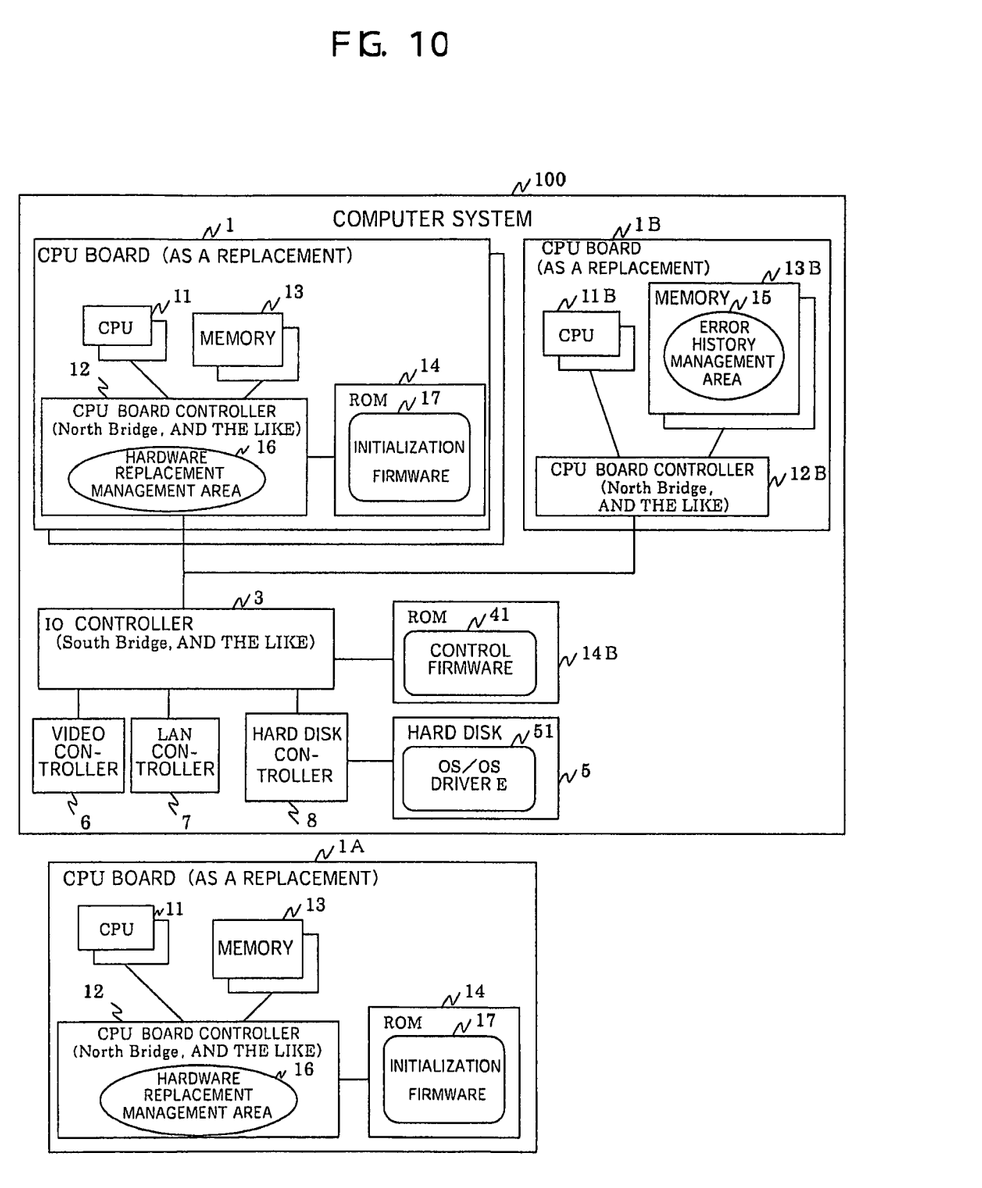
FIG. 10 is a view illustrating an example of arrangement when an error history management area exists out of the CPU board according to the present embodiment.

Arrangement examples other than one described above are illustrated in FIGS. 9 and 10. FIG. 9 illustrates an arrangement example where the control firmware 41 exists on a unit to be replaced (on the CPU boards 1 and 1A). In addition, FIG. 10 illustrates an arrangement example where the error history management area 15 exists outside of the CPU boards 1 and 1A which are units to be replaced (in the inside of a memory 13B on a CPU board 1B that is not to be replaced in FIG. 10). In these arrangement configurations, processing and management similar to those described above can be carried out.

A first storage device corresponds to a memory or a ROM that is used as the error history management area 15 in the present embodiment. A second storage device corresponds to a ROM that stores the initialization firmware 17 in the present embodiment. In addition, a third storage device corresponds to a ROM that stores the control firmware 41.

According to the present embodiment, when a unit is replaced during operation of a system in a general-purpose OS, an OS or an OS driver that depends on the system does not need to be used in order not to disable notification of an error that occurs in a unit after the replacement. Therefore, there are advantageous effects, such as reduction in the number of man-hours needed for development of an OS or an OS driver and increase in speed of such development.

A program that executes each of the steps described above in a computer configuring a computer system (information processing apparatus) can be provided as an error notification program. The program described above is stored in a recording medium which can be read out by a computer. In this manner, the program can be executed by a computer configuring the information processing apparatus. Here, the recording medium which can be read out by a computer described above includes an internal storage device implemented internally in a computer such as a ROM and a RAM, a CD-ROM and a flexible disc, a DVD disc, a magneto-optical disc, a portable storage medium such as an IC card, and a database retaining a computer program, or other computers and a database thereof, and further an online transmission medium.

Disabling of error notification and release of disabling can be controlled based on replacement information retained on a unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus including a unit having a processing unit, comprising:
    a control device that is mounted on the unit and includes a replacement information storage section that stores replacement information indicating that the unit has been replaced, the replacement information initialized at the time when the information processing apparatus is started or when the unit is replaced;
    a first storage device that stores error information based on occurrence of an error in the control device, the error information initialized at the time when the information processing apparatus is started;
    an initialization control section that initializes the information processing apparatus; and
    a unit control section that includes an error monitoring section that monitors error information stored in the first storage device, and controls the unit.

2. The information processing apparatus according to claim 1, wherein
    the information processing apparatus further includes a system control device that controls the information processing apparatus, and
    the unit control section further includes:
    an error notification section that notifies the error information to the system control device; and
    an error notification disabling section that disables notification of the error information to the system control device by the error notification section when an occurrence frequency of the error exceeds a predetermined frequency.

3. The information processing apparatus according to claim 1, wherein
    the error information stored in the first storage device is initialized by the initialization control section when the information processing apparatus is started.

4. The information processing apparatus according to claim 1, wherein
    the error information stored in the first storage device is stored by the unit control section when an error occurs in the control device.

5. The information processing apparatus according to claim 1, wherein
    the information processing apparatus further includes a second storage device that is different from the first storage device, and
    the second storage device functions as an initialization control section when an initialization firmware stored in the second storage device is executed.

6. The information processing apparatus according to claim 5, wherein
    the information processing apparatus further includes a third storage device that is different from the first storage device and the second storage device, and
    the third storage device functions as the unit control section when a control firmware stored in the third storage device is executed.

7. The information processing apparatus according to claim 6, wherein
    the third storage device is mounted on the unit.

8. A non-transitory medium that records an error notification program that controls a computer to execute error notification when an error occurs in the inside of a unit that can be replaced even during operation of an information processing apparatus in a manner readable by the computer, the error notification program controlling the computer to execute:
    initializing replacement information retained in a storage device included in the unit and indicating that the unit has been replaced, when the unit is replaced;
    initializing disabled information indicating that notification of an error is disabled and setting a predetermined value to the replacement information, when the replacement information is initialized and an error occurs;
    setting a predetermined value to the disabled information based on an error occurrence frequency; and
    disabling notification of an error when the predetermined value is set to the disabled information, and notifying an error when the predetermined value is not set to the disabled information.

9. The non-transitory medium that records the error notification program according to claim 8, further controls a computer to execute determining whether start of the information processing apparatus or start accompanying replacement of a unit takes place, wherein
    in the initialization of the replacement information, the disabled information is initialized when a result of the determination indicates start of the information processing apparatus.

10. An error notification method of when an error occurs in the inside of a unit that can be replaced even during operation of an information processing apparatus, the error notification method that executes:
    initializing replacement information retained in a storage device included in the unit and indicating that the unit has been replaced, when the unit is replaced;

initializing disabled information indicating that notification of an error is disabled and setting a predetermined value to the replacement information, when the replacement information is initialized and an error occurs;

setting a predetermined value to the disabled information based on an error occurrence frequency; and disabling notification of an error when the predetermined value is set to the disabled information, and notifying an error when the predetermined value is not set to the disabled information.

* * * * *